United States Patent [19]

Le Pierres

[11] Patent Number: 4,566,677
[45] Date of Patent: Jan. 28, 1986

[54] VIBRATION DAMPER AND IN PARTICULAR FREQUENCY ADAPTER FOR A HELICOPTER BLADE

[75] Inventor: Gildas Le Pierres, La Ferte Alais, France

[73] Assignee: Vibrachoc, France

[21] Appl. No.: 502,236

[22] Filed: Jun. 8, 1983

[30] Foreign Application Priority Data

Jun. 11, 1982 [FR] France .............................. 82 10198

[51] Int. Cl.[4] .............................................. F16F 9/14
[52] U.S. Cl. .................... 267/140.1; 188/268; 188/288; 416/134 A; 416/140
[58] Field of Search ............... 188/279, 277, 275, 276, 188/268, 281, 288, 378–381, 314, 316, 322.5; 267/8 R, 35, 63 A, 121, 123, 152, 153, 140.5, 141.4, 141.5, 140.1, 118, 134; 416/500, 107, 134 R, 134 A, 140 R, 140 A; 244/17.27

[56] References Cited

U.S. PATENT DOCUMENTS

| 1,304,311 | 5/1919 | Heldrich | 267/35 |
| 1,983,259 | 12/1934 | Weiland | 267/35 |
| 2,514,140 | 7/1950 | O'Connor | 188/379 |
| 3,403,899 | 10/1968 | Plume | 267/35 |
| 3,658,314 | 4/1972 | Luzsicza | 267/35 X |
| 3,842,945 | 10/1974 | Potter | 188/268 |

FOREIGN PATENT DOCUMENTS

| 2298737 | 8/1976 | France | 188/268 |
| 1445373 | 8/1976 | United Kingdom . | |

Primary Examiner—Duane A. Reger
Assistant Examiner—Michael P. Gilday
Attorney, Agent, or Firm—Larson and Taylor

[57] ABSTRACT

The device comprises two rigid elements 1a, 1b, 2 and an elastomer mass 10 interposed therebetween so as to be deformed when the elements move relative to each other in a longitudinal direction. The device includes a closed space with a restriction element 16 defining two chambers 23, 24 whose volumes vary inversely upon movement of the chamber walls, the two chambers being interconnected by one or more passages, the empty space being filled with a viscous fluid material so as to produce a damping effect in the passages. Application to helicopter blade frequency adapters.

4 Claims, 4 Drawing Figures

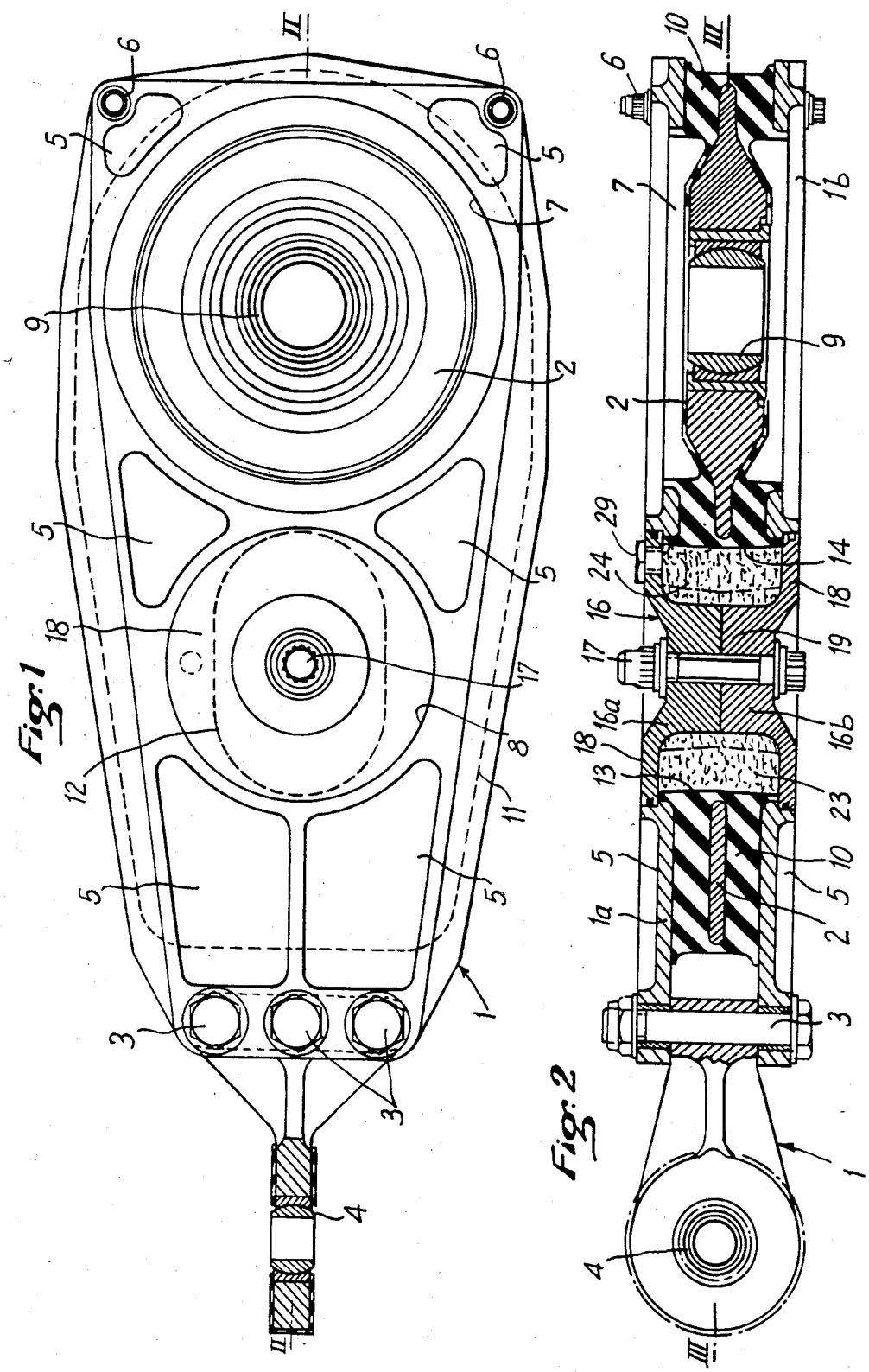

VIBRATION DAMPER AND IN PARTICULAR FREQUENCY ADAPTER FOR A HELICOPTER BLADE

The present invention relates to a vibration damper such as for example a frequency adapter for a helicopter blade.

It is well known to employ on helicopter rotor blades frequency adapters having two opposed ends one of which is connected to the rotor itself while the other is connected to the blade at a certain distance from the axis of the rotor, the adapter extending longitudinally in a direction more or less parallel to the direction of the blade. The damping required for the vibration frequency adaptation is effected by the operation of an elastomer mass which is generally subjected to shear stress and interposed between the two metal elements respectively connected to the rotor and the blade. Owing to the severe stresses due to the environment and the high degree of reliability required, the choice of the damping elastomer material is extremely delicate and, in practice, a compromise is adopted between the mechanical characteristics of this material and its performances as concerns dissipation, since any increase in one of these qualities results in a decrease in the other.

An object of the present invention is to overcome these drawbacks and to provide a vibration damping device, in particular a helicopter blade adapter, which has, while satisfying the particular requirements of the technical and physical environment, high qualities of strength, duration and reliability and damping characteristics which are particularly high and may be moreover easily adjusted and adapted to different cases.

The invention provides a vibration damping device, in particular a frequency adapter for a helicopter blade, of the type comprising a first rigid, for example metal, element adapted to be connected to a first part such as for example a rotor, a second rigid, for example metal, element adapted to be connected to a second part such as for example a helicopter blade, and an elastomer mass interposed between said elements so as to deform when the elements move relative to each other substantially in a given direction, the device including a closed space whose two opposed walls, as seen in said direction, are constituted by said elastomer material, a restriction element being inserted in said space between said two walls so as to define substantially two chambers whose volumes vary inversely upon the movement of the walls, said two chambers being interconnected by one or more passages, the empty space being filled with a viscous material such as a grease or an oil so as to produce a damping effect in the region of the passages when said material flows from one chamber to the other.

The restriction element may advantageously form with the empty space one or more constricted passages so as to produce a damping effect when the movement of the elastomer decreases the volume of one of the chambers and increases the volume of the other chamber in consequently creating a notable difference in pressure between the two chambers. However, by way of a modification, the restriction element may form one or more elongated passages in which a shearing of the fluid occurs, in which case the pressure variation does not perform a preponderant function.

Advantageously, the device may include means for compensating for thermal expansion of the fluid, such as manometric capsules, i.e. capsules whose volume decreases when the pressure of the fluid increases, these means being preferably disposed inside the restriction element located in the space defining the two chambers. According to a particularly advantageous feature of the invention, said expansion compensating means communicate with the fluid in the middle of the passage extending from one chamber to the other, at a point where the dynamic pressure created by the movement has no repercussion, so that the overpressures and the depressions thus created have no effect on the variation in the total volume offered to the fluid while the variations in volume due to phenomena of thermal expansion or contraction are perfectly compensated for.

Advantageously, these expansion compensating means have one or more chambers located in the restriction element, said chambers being occupied by manometric capsules or like expansion compensating devices, the chamber or chambers communicating with the fluid through one or more channels, preferably of small section, formed in the central restriction element and opening onto the middle of said passages extending from one chamber to the other.

The central restriction element is preferably directly connected to one of the two rigid elements while the opposed elastomer walls are subjected to forces on the part of the other rigid element. However, said restriction element could also be carried by the elastomer itself provided that, in the region where the restriction element is supported, the displacement of the elastomer is nil or small with respect to the mean displacement of the elastomer walls producing the inverse variations in the volumes of the chambers.

Preferably, the central restriction element may have a substantially cylindrical central part defining the throttling or constricted passages with the neighbouring lateral walls of the space, this cylindrical part being extended at both ends by flanges forming a cover closing the empty space. Thus, the empty space may be defined in the elastomer in the form of a cylindrical cavity which is preferably oval or nearly oval.

Particularly advantageously, one of the two rigid elements of the device may have two parallel, preferably ribbed, parts while the other rigid element has a single part extending between the two parts of the first element and parallel to these parts, the confronting faces of these parts being connected by the elastomer material, said parts of the two elements and the elastomer having a preferably oval cavity in which is inserted said central restriction element whose flanges are connected to the two parts of the first element, close the cavity and define with the central part the two chambers and the passages.

A frequency adapter arranged in this way affords a given stiffness and a given damping as a function of the operational frequencies of the blade with the use of an elastomer having a lower internal damping effect and increased mechanical characteristics. Moreover, the device is lighter and has a better performance as concerns fatigue.

Further features and advantages of the invention will be apparent from the following description given merely by way of a non-limiting example with reference to the accompanying drawing in which:

FIG. 1 is a top plan view of a frequency adapter according to the invention;

FIG. 2 is a longitudinal sectional view taken along line II—II of this adapter;

Figure 3:
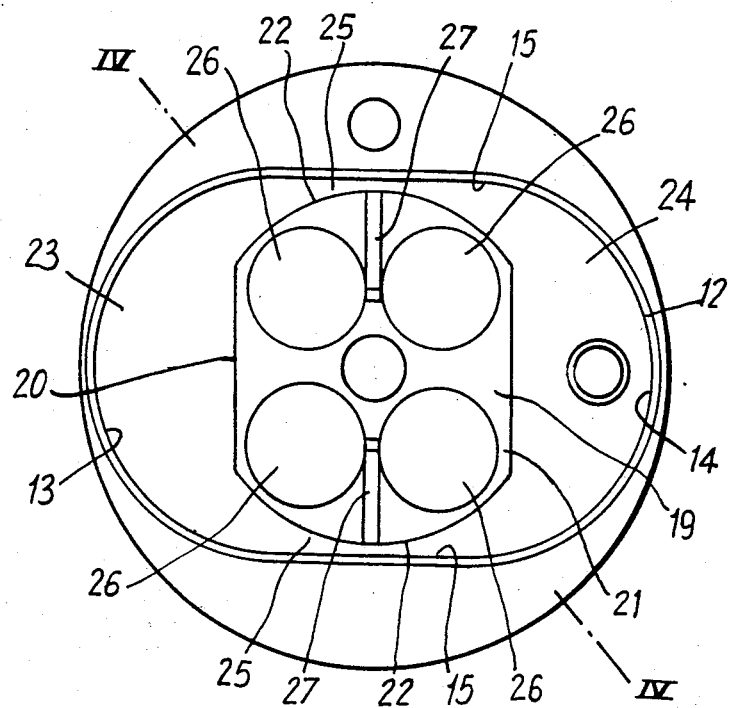
FIG. 3 is a sectional view taken along line III—III of the central part of the adapter.
Figure 4:
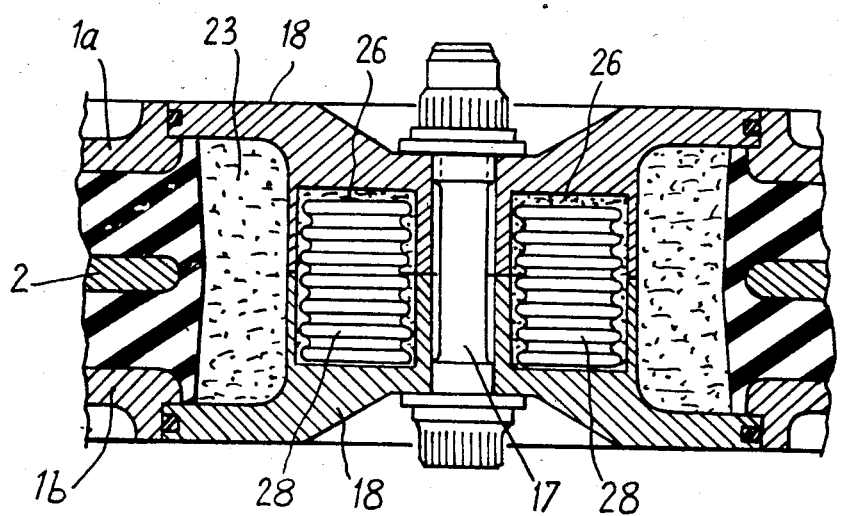
FIG. 4 is a sectional view taken along line IV—IV of the central part of the adapter.

The illustrated adapter comprises a first rigid element 1 for connection to a helicopter blade and a second rigid element 2 for connection to a rotor. The elements are made from light alloy. The element 1 is made in two parts 1a, 1b which are symmetrical relative to the horizontal plane, the ribbed shape of which is clear in FIG. 1. These element parts 1a and 1b extend in parallel directions and are connected by a plurality of bolts 3 to a fixing lug which is part of the element 1 and has a mounting ball joint 4. Apart from recesses 5, the parts 1a and 1b, which are interconnected at the other end by bolts 6, define two circular passages, namely a passage 7 of larger diameter and a passage 8 of smaller diameter, these passages being centrally disposed.

Extending between the two parts 1a and 1b is the element 2 which has, in the centre of the passage 7, a mounting ball joint 9 and, facing the passage 8, an oblong passage 12 whose major dimension, along the longitudinal axis II—II, is substantially equal to the diameter of the passage 8 while transversely the dimension of the oblong passage is less than the diameter of the passage 8 and just slightly larger than the transverse dimension of the empty space, reference to which will be made hereinafter.

Disposed between the confronting surfaces of the parts 1a, 1b and the element 2, is an elastomer mass 10 which is bonded to said surfaces and whose peripheral contour is shown in dotted line 11 of FIG. 1. An oblong empty space, the outline 12 of which is shown in dotted line in FIG. 1, and which forms the oblong passage, extends through the central part of the elastomer mass. As can be seen in FIG. 2, the dimensions of the oblong empty space 12 are slightly less than the dimensions of the corresponding oblong passage of the element 2 so that the inner edge of this passage is covered with the elastomer throughout. It can be seen that the oblong space formed in this way has two concave elastomer walls 13, 14 in alignment on the longitudinal axis II—II or III—III and two substantially rectilinear transverse walls 15.

Disposed in this oblong space extending through the elastomer material is a restriction element 16 formed by two halves 16a, 16b assembled by a central bolt 17. This element has two circular flanges 18 which are fitted, with interposition of a sealing element, in the two openings 8 which are thus closed in a sealed manner, the tightening of the bolt perfectly interconnecting the element 16 and the element 1. The element 16 has a cylindrical central part 19 which extends between the two flanges 18 and whose section in the horizontal plane is clearly shown in FIG. 3. This section has two rectilinear edges 20, 21 facing the curved walls 13, 14 and two edges 22 in the shape of an arc of a circle facing the wall parts 15 of the oblong space formed in the elastomer. It can be seen that there are formed in this way two chambers 23, 24 of equal volumes interconnected by two narrow passages 25.

Formed inside the element 16 are four internal chambers 26 of cylindrical shape which communicate with the exterior only through two transversely extending narrow channels 27, each channel 27 opening onto the corresponding passage 25 exactly at the narrowest place of this passage and simultaneously feeding two chambers 26. The major part of each chamber 26 is occupied by a manometric capsule 28 whose volume decreases when the pressure around it increases.

The device operates in the following manner:

The device according to the invention is stressed solely along the longitudinal direction represented by the lines II—II and III—III in FIGS. 2 and 3. Consequently, when, under the effect of for example vibrations, the inner element 2 moves toward the right in the Figures, it displaces the elastomer therewith and this elastomer is subjected to shear stress and the wall 13 approaches the edge 20 of the element 16 while the wall 14 moves away from the edge 19, the decrease in the volume of the chamber 23 being thus exactly compensated for by the increase in the volume of the chamber 24. Under the effect of the overpressure created in the chamber 23 and the depression occurring in the chamber 24, the viscous fluid, for example an oil or a grease, which was introduced into the available space through a passage closed by a plug 29 and which occupies the whole of the space available inside the chambers, the passages, the channels and the internal chambers, is urged out of the chamber 23 toward the chamber 24 through the throttling passages 25. There is consequently produced a large damping effect whose characteristics are determined by the viscosity of the fluid and the dimensions of the passages 25. Thus it is sufficient to employ an elastomer material having lower damping properties and consequently greater stiffness and improved mechanical characteristics in particular as concerns strength, while completing the damping required for the adaptation of the blade vibration frequency to the desired values. In the event of temperature variations, for example an increase in temperature, the expansion of the fluid is accommodated and compensated for by the decrease in the volume of the manometric capsules 28, the additional volume of fluid entering the inner chambers 26 through the channels 27. However, it will be understood that, irrespective of the dynamic operation, while the pressure increases, upon displacement of one element relative to the other, in one of the chambers and decreases in the other, it is practically unmodified in the central part of the passages 25 and therefore in the channels 27, so that the manometric capsules have no disturbing effect on the dynamic operation and merely respond to the thermal expansions or contractions.

Although the invention has been described in respect of a particular embodiment, it must be understood that the scope of the invention is in no way limited thereby and that various design or material modifications may be made therein without departing from the spirit and scope of the invention as defined in the claims.

Having now described invention, what I claim as new and desire to secure by Letters Patent is:

1. A vibration damping device comprising a first rigid element for connection to a first part such as for example a rotor, wherein the first rigid element has two substantially parallel parts spaced apart from each other and each provided with a first passage and a second passage, a second rigid element for connection to a second part such as for example a helicopter blade, wherein said second rigid element has a part which extends between said two parts of said first element and carries bearing means within a first of said passages in said parts of said first element and a substantially oblong passage in axial alignment with a second of said passages of said two parts of said first element, and a mass of elastomer material interposed between and combined with said elements so as to be deformed when said elements are moved relative to each other substantially in a direction parallel to said first and second elements, the confronting surfaces of said parts of said two rigid elements being interconnected by said elastomer material, said oblong passage in said mass of elastomer material in axial alignment with said second passage of said two parts of said first element, a restriction element secured to one of said first and second rigid elements and inserted in said oblong passage in said mass of elastomer material so as to define substantially two chambers whose volumes vary inversely upon relative movement of said first and second rigid elements in said direction, wherein said restriction element has flanges which close said oblong passage in said elastomer material and a central part which defines said two chambers and throttling passage means putting said chambers in communication with each other, a viscous material filling said two chambers and said throttling passage means so as to produce a damping effect in said throttling passage means when the viscous material flows from one chamber to the other.

2. A device according to claim 1, comprising means for compensating for thermal expansion.

3. A device according to claim 2, wherein said compensating means are disposed inside said restriction element and comprise channels opening onto the middle of said throttling passage means and putting said chambers in communication with said compensating means.

4. A device according to claim 1 wherein said restriction element has a cylindrical central part which has two sides in the shape of an arc of a circle defining said passage means.

* * * * *